Dec. 14, 1926.

C. BLACK 1,610,597

LAST BLOCK CENTERING MACHINE

Filed May 23, 1924     3 Sheets-Sheet 1

INVENTOR.
Carl Black,
by C. A. Mason Attorney.

Dec. 14, 1926.  1,610,597
C. BLACK
LAST BLOCK CENTERING MACHINE
Filed May 23, 1924  3 Sheets-Sheet 2

INVENTOR
Carl Black,
by

Patented Dec. 14, 1926.

1,610,597

UNITED STATES PATENT OFFICE.

CARL BLACK, OF ALFELD-ON-THE-LEINE, GERMANY, ASSIGNOR TO UNITED SHOE MACHINERY CORPORATION, OF PATERSON, NEW JERSEY, A CORPORATION OF NEW JERSEY.

LAST-BLOCK-CENTERING MACHINE.

Application filed May 23, 1924, Serial No. 715,427, and in Germany May 24, 1923.

This invention relates to work centering machines, and is disclosed in connection with a machine for centering last blocks, though the invention is equally applicable to the centering of work pieces generally which are to be treated in a copying lathe.

In a copying lathe, a work piece is cut by reference to a model which is also carried in the machine, and, in general, the dimensions of the work piece will be different from those of the model, being pantographically magnified or reduced by the so-called "grading" mechanism. It is thus difficult for the machine operator to predict accurately just where the surface of the finished work piece will run, and it often happens that his judgment in placing the rough block in the machine is an error, so that there is insufficient material on the rough block in some places, which spoils that work piece; so that there is an undue surplus of material in places, which results in obtaining a smaller finished piece than could have been got out of that rough block. It has long been regarded as desirable to mark the ends of the work pieces with centers or dog marks upon which they may be hung in the copying lathe in order that the question of getting the desired finished work piece out of the rough block may not be left solely to the hasty judgment of the machine operator; and in order to obtain the best results under conditions of pantographic grading, it is necessary that the centers or dog marks shall be so placed in the work piece as to define a rotation-axis having the same geometrical relation to the work piece as the corresponding axis of rotation has in the model.

For example, suppose that the model last is of such shape that the rotation-axis, or line joining the dog marks, is twice as far from the outside lateral edge of the forepart as it is from the inside lateral edge. Then, in order to cut lasts from this model in the copying lathe with the proper degree of economy, it is necessary that the rotation-axes defined by the dog marks to be impressed in the blocks to be cut shall have this same relation to the forepart edges of the blocks in each case. A similar statement is true regarding the vertical dimension.

Accordingly, a principal object of the present invention is the provision of a device for locating a rotation-axis in a work piece for a copying lathe in the same geometrical or proportional relation to the external surface of the work piece as the corresponding line in the model to be used bears to the surface of this model. To this end, an important feature of the invention consists in a means for locating a copying lathe work piece relatively to a marking means or dog in directions perpendicular to the axis of rotation that it is to have in the copying lathe, in such manner that the marking means shall mark the work piece in the same geometrical relation to its surface irrespective of its dimensions. This geometrical relation of course must be variable at will in order to correspond with the particular model used. Somewhat more broadly stated, the invention provides means for dividing a dimension of an object in any desired proportion comprising feelers and a cooperating marking dog. In the disclosed machine the locating means takes the form of two pairs of feelers or locating members, those of each pair moving in opposite directions at different (and relatively adjustable) speeds, and those of one pair moving in directions which are perpendicular to the directions of movement of the other pair. The feelers of each pair meet each other at a point which registers with the desired rotation-axis as located by marking dogs, and there is provided a connection between the relative speed adjustments and the marking dog adjustments which maintains this relation at all times, independently in the two perpendicular directions. Thus the rotation-axis is located in the proper geometrical relations to the surface measured both horizontally and vertically, which is the result desired.

These and other features of the invention comprising certain combinations and arrangements of parts will be understood from the following description of a preferred embodiment thereof selected for purposes of illustration and shown in the accompanying drawings in which, Fig. 1 is a diagram illustrating the theory and operation of the locating means;

Figure 1:
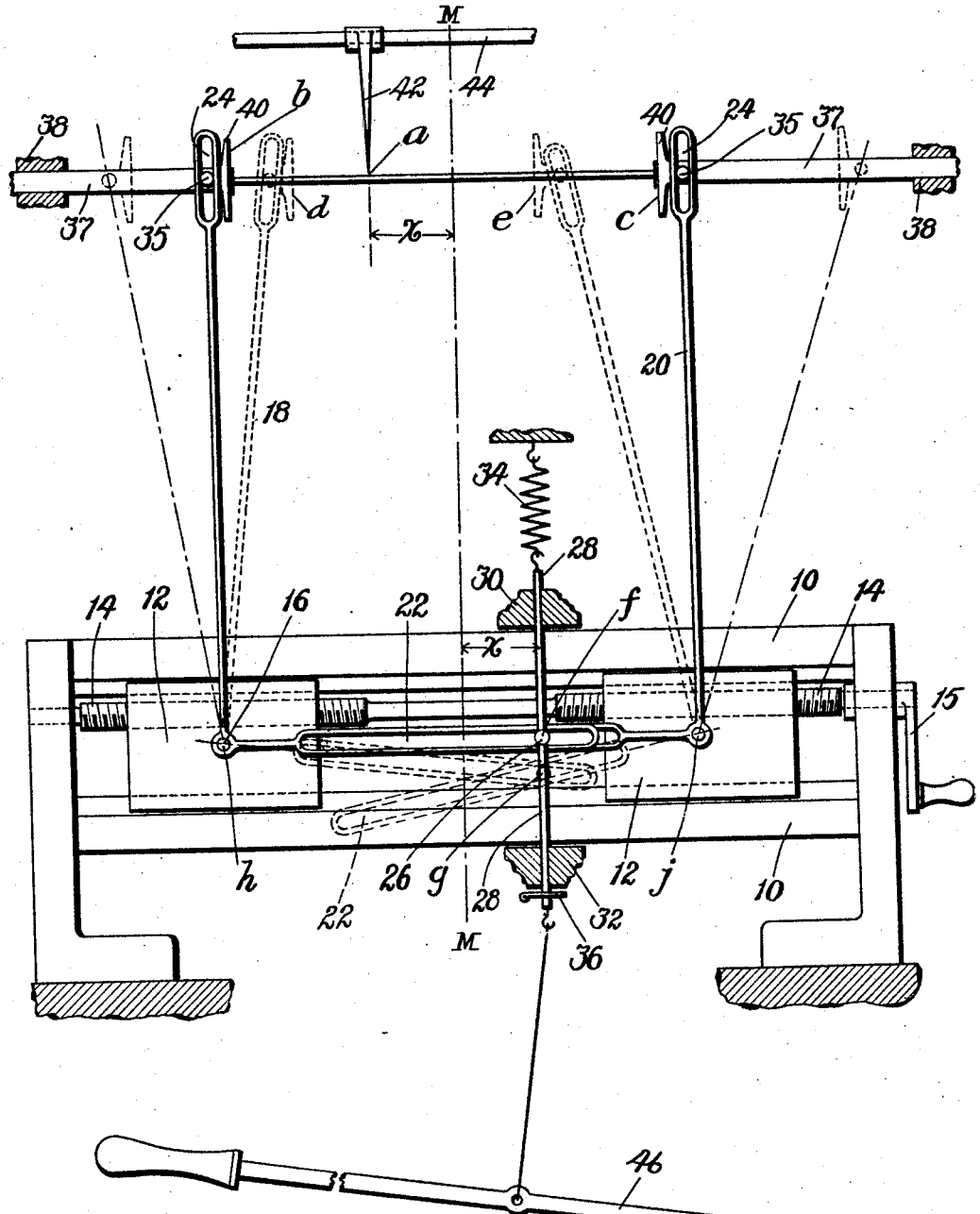

Referring first to Fig. 1, the two horizontal guides 10 have mounted between them the slide blocks 12, which are threaded to a right and left screw 14, operable by a handle 15, by means of which they can be moved toward and from one another at equal speeds so as to be always at equal distances from the center line M—M of the system. Similarly pivoted at points 16 to the blocks are bell-crank levers 18, 20 in the arms of which are formed slots 22, 24, the longitudinal axes of which are substantially at right angles. A pin 26 passes through the two horizontal slots 22 and is carried on a bar 28 slidably mounted in guides 30, 32, and pulled upwardly by a spring 34. A pin 36, passing through a hole in the bar 28, is arranged to hold the pin 26 in the line joining the centers 16 so that the slots 22 extend in the same straight line.

The guides 30, 32 are adjustable together to the right and left in Fig. 1 to adjust the pin 26 back and forth in the slots 22 when in such collinear adjustment, thus effecting such adjustment of the pin without causing any movement of the bell-cranks 18, 20.

The slots 24 in the upper ends of the bell-cranks each embraces a pin 35 on a rod 37 guided for movement to the right or left, as seen in Fig. 1, in guides 38. Each rod carries a feeler 40. A pointer 42 is slidably mounted on a rod 44 for movement parallel to that of the rods 37. The pointer 42 and the guides 30, 32 are supposed to be so interconnected that when the pointer is moved a distance $x$ to one side of the center line M—M, the pin 26 will be moved an equal distance $x$ to the other side of the line. Means for actually accomplishing this result will be described later.

The manner of using the device is as follows:—The pin 36 is placed in position as shown in Fig. 1, and the model in relation to which the work pieces are to be marked or centered is placed between the feelers 40. The screw 14 is then operated until the feelers 40 contact with the sides of the model. The vertical arms of the bell-cranks will remain vertical during this adjustment of the blocks 12, the slots 22 sliding on the pin 26. The pointer 42 is then moved laterally until it registers with the dog marks which indicate the axis of rotation in the model, say to the point $a$, and the pin 26 will thereby be moved the same distance in the opposite direction from the line M—M. The pin 36 is now removed, and the spring 34 will separate the feelers by lifting the pin 26 and the slots 22.

Suppose now that a work piece of generally similar form to the model is placed between the feelers 40 and the bar 28 pulled down as by a treadle 46 until the feelers contact with the work piece. If the work piece be smaller than the model, the bell-cranks will be tilted by the descending pin 26 into the dotted line positions shown in Fig. 1, and if the work piece be larger than the model the cranks will move only to the dot-and-dash line position shown in Fig. 1. The work piece is then marked as indicated by the pointer 42 at $a$.

We have now to examine the relation of the position of the mark at $a$ to the work piece dimension $de$ between the feelers, as compared with the relation of the position of the pointer at $a$, with the corresponding dimension $bc$ of the model. Denote the original position of the pin 26 by $f$, the final position by $g$, and the positions of the pivots 16 by $h$ and $j$ respectively, as shown in Fig. 1. Then, having regard to the conditions of the original adjustment of the machine to the model;

$$ab = fj;\quad ac = fh;\quad bh = cj$$

$$ec = cj \times \frac{fg}{fj}$$

$$bd = bh \times \frac{fg}{fh}$$

whence $$\frac{ec}{bd} = \frac{fh}{fj} = \frac{ac}{ab}$$

whence $$\frac{ac - ec}{ab - bd} = \frac{ae = ac}{ad = ab}$$

so that the pointer at $a$ divides the corresponding dimensions of the model and work piece in the same ratio irrespective of the absolute size of the work piece. A necessary consequence of the above is that the feelers, if moved together with nothing between them, would meet at the point $a$.

Figure 4:
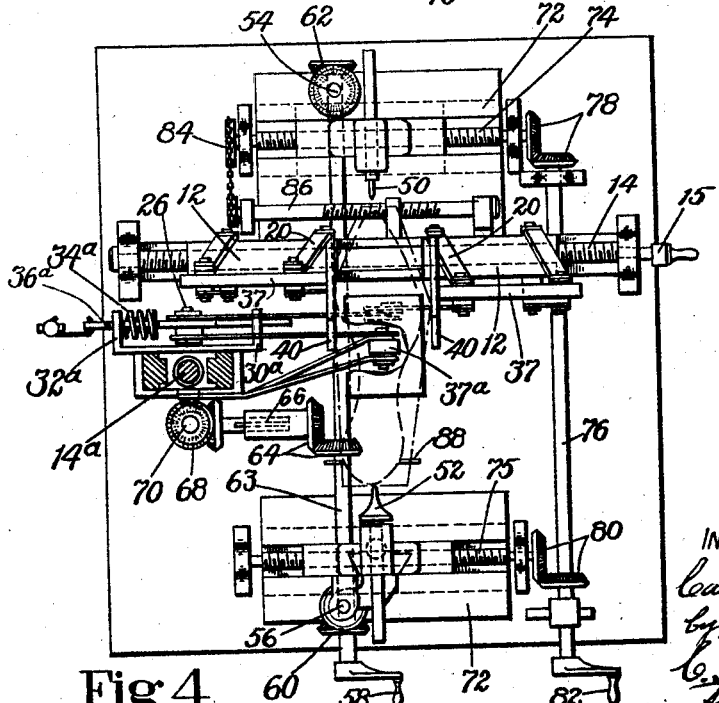
Fig. 4 is a plan view.

The above discussion has suggested how a single dimension of a work piece can be divided in the same ratio as the corresponding dimension of a model. The machine shown in Figs. 2, 3, 4 provides for such division of two dimensions of the work piece taken at right angles to each other whereby the axis of rotation defined by the dog marks at the ends of the work piece can be located in the same geometrical position in the work piece as it occupied in the model from which the machine was set.

The guides 10, slide blocks 12, screw 14, handle 15, pivots 16, bell-cranks 18, 20, pin 26 and guides 30, 32 are constructed essentially as shown in Fig. 1. The vertical arms of the bell-cranks are constructed in bifurcate form to straddle the blocks 12 as shown in Fig. 4 for the sake of greater stiffness, but their operation is substantially as described in connection with Fig. 1. The rods 37 instead of being guided in slide bearings are hung upon a parallel link mechanism consisting of the upwardly extending arms 18, 20 of the bell-cranks and parallel links 48 by which the outside ends of the rods 37 are connected to the blocks 12, but their operation is substantially the same as before described. The rods 37 carry feelers 40 substantially as shown in Fig. 1.

Figure 2:
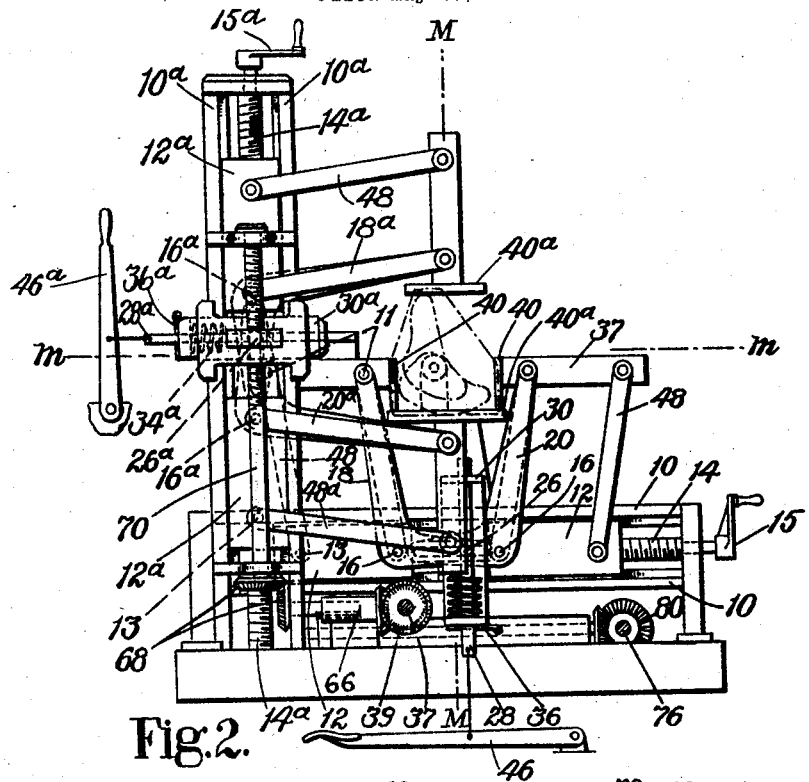
Fig. 2 is a front elevation of a machine embodying the principles brought out in Fig. 1.
Figure 3:
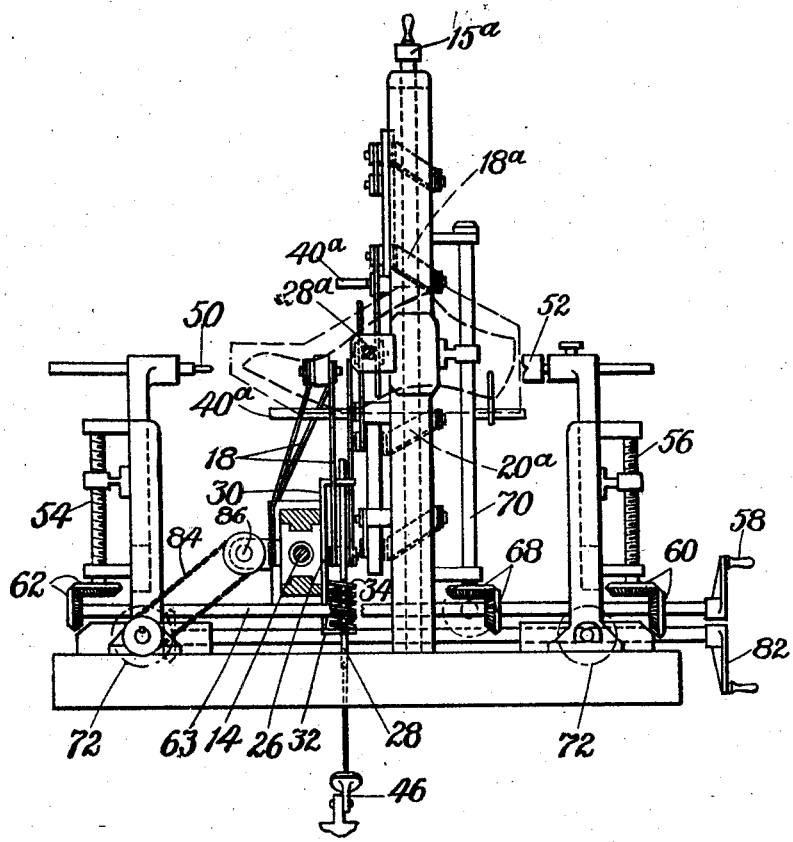
Fig. 3 is a side elevation of the machine.

Arranged at the side of the machine, as shown in Fig. 2, are vertically extending guides 10ª upon which is mounted mechanism of exactly the same type working in exactly the same way and terminating in feelers 40ª, all of the members of this mechanism having numbers corresponding to those of the mechanism first described but with the additional index $a$.

The marking dogs 50, 52 are located on vertically adjustable sliding standards the height of which is regulated by screws 54, 56 which are operated by a handle 58 and bevel gearing 60, 62 on a shaft 63. The screws 54, 56 have the same pitch and the two dogs 50, 52 are always kept at the same height. A bevel gear 64 on the shaft 63 through a telescoping connection 66 actuates a bevel gear 68 which operates a screw 70 which carries the slide 30ª and moves the pin 26ª vertically in the opposite direction and to the same extent as the vertical movement of the dogs 50, 52.

The marking dogs are also horizontally adjustable upon guides 72, being moved by like screws 74, 75 upon these guides, the screws being connected to the shaft 76 by bevel gears 78, 80, and the shaft being operated by a handle 82. The screw 74 by sprocket gearing 84 is connected to the shaft 86 which is threaded and arranged to carry back and forward the guides 30 and 32 upon which the pin 26 is mounted, the gearing being such as to move the pin 26 in the opposite direction to the horizontal movement of the dogs 50, 52 but by the same amount at all times, as described above in connection with Fig. 1. There is also provided a V-shaped resilient fork 88 for centering the rear part of the last block, as there is always sufficient wood in that part of the last block and any proportional adjustment is unnecessary there.

The use of the machine is as follows: The two pins 36, 36ª are placed in position so as to center the slots engaged by the pins 26, 26ª. The model is then placed between the feelers 40, 40ª and the screws 14, 14ª are operated to carry the blocks 12, 12ª toward each other, respectively, until the two sets of feelers grasp the model between them. The feelers in this instance of the invention are arranged to grasp the forepart of the last and last block, the heel being taken care of by the fork 88. The handle 82 is then operated to carry the dogs 50, 52 into horizontal registration with the ends of the model which may have been already marked by dogs. At the same time, this adjustment of the dogs carries the pin 26 in the opposite direction and by the same amount relatively to the center line M—M. The handle 58 is then operated to raise the dogs into vertical registration with the ends of the model and this operation also adjusts the pin 26ª in the opposite direction and in the same amount relatively to the center line $m$—$m$. The machine being thus set for the model, the pins 36, 36ª are removed whereupon the springs 34, 34ª operate and spread the feelers apart to their fullest extent.

The block to be marked is set in the machine with its heel on the fork 88 and its forepart between the four feelers 40, 40ª. The rods 28, 28ª are then drawn out by any suitable mechanism such as the treadle 46 shown in Fig. 1, and the two sets of feelers move the block horizontally and vertically so that the dogs have the same geometrical relation to it that they had to the model in the adjustment of the machine. In other words, if the vertical distance between the feelers 40ª was divided in a certain ratio in the case of the model that vertical distance when the feelers 40ª are grasping the block will be divided in the same ratio. A similar statement is true of the horizontal distance of the feelers 40, but the ratio in that case need not be the same as that appertaining to the vertical distance.

The dogs may then be driven into the block, while thus held, in any desired manner.

Thus the rotation-axis defined by the dog marks in the block is located in the same geometrical horizontal and vertical relations to that portion of the block embraced by the feelers as exist between the model rotation-axis and the model. If, therefore, a last block so marked be placed in the copying lathe with the model used in setting the block marking machine, and if the width grading mechanism be set to get the maximum possible last out of the block, there will be about the same surplus of material to be removed all around the block, and undue waste is avoided. At the same time the risk of attempting to get too large a last out of the block, and thereby running out of its surface somewhere, is minimized.

Having described my invention, what I claim as new and desire to secure by Letters Patent of the United States is:—

1. In a machine of the class described, block marking means and means for holding and presenting a block to the marking means with a desired cross-section of the block in a predetermined geometric relation to the marking means, irrespective of the dimensions of the block.

2. In a machine of the class described, block marking means and means for holding and presenting a block to the marking means to divide two mutually perpendicular dimensions of a selected cross-section of the block in predetermined ratios, respectively, irrespective of the dimensions of the block.

3. In a machine of the class described, last block marking means arranged to indent the ends of a last block to establish an axis of rotation for the block in the last lathe, and means for moving the block relatively transversely to the marking means to locate the said axis of rotation in predetermined geometrical relations, measured according to the vertical and lateral dimensions of a selected cross-section of the block, respectively, irrespective of the absolute size of the block.

4. In a machine of the class described, block marking means, a pair of feelers arranged to locate a block relatively to the marking means, members for moving the feelers, and operating means for moving the members, there being an adjustable connection between the operating means and the members to regulate the relative speeds of the feelers in approaching the block.

5. In a machine of the class described, last block marking means, a pair of feelers arranged to grasp a last block between them, a pair of levers, one arm of each of which operates a said feeler, and operating means connected to the other arms of the levers, the relative effective lengths of the levers being adjustable to vary the movement ratio of the feelers.

6. In a machine of the class described, last block marking means, a pair of feelers arranged to grasp a last block between them, a pair of levers, one arm of each of which operates a said feeler, and operating means connected to the other arms of the levers, the point of application of the operating means being adjustable to vary the relative throw of the levers.

7. A work positioning means comprising a block marking means and members arranged to be moved in opposite directions at a velocity ratio which is constant during any operation of the machine, but which is adjustable at will, and to grasp an article at the extremities of a dimension thereof, whereby articles differing in said dimension may be positioned with a point geometrically related to the dimension in registration with the block marking means.

8. In a machine of the class described, a marking means, a pair of feelers constructed and arranged to be moved in opposite directions to grasp a work piece and hold it with reference to the marking means, the marking means being adjustable parallel to the direction of movement of the feelers, and means for controlling the velocity ratio of the feelers to cause them to meet each other in registration with the marking means irrespective of its adjustment.

9. In a machine of the class described, a marking means, a pair of feelers constructed and arranged to be moved in opposite directions to grasp a work piece and hold it with reference to the marking means, the marking means being adjustable parallel to the direction of movement of the feelers, levers carrying the feelers on their ends and an operating means having an adjustable connection with the levers, constructed and arranged to cause the feelers to meet each other in registration with the marking means, irrespective of its adjustment.

10. In a machine of the class described, a marking means, a pair of feelers, means for moving them in opposite directions to grasp a work piece and hold it with reference to the marking means, the marking means being adjustable parallel to the direction of movement of the feelers, levers carrying the feelers and an operating means having an adjustable connection with the levers, there being a mechanical connection between the marking means adjustment and the operating means adjustment constructed and arranged to cause the feelers to meet each other in registration with the marking means, irrespective of its adjustment.

11. In a machine of the class described, a tool, a pair of feelers arranged to grasp a work piece between them and hold it with reference to the tool, a lever for operating each feeler, and means for varying the relative mechanical advantages of the levers to adjust the geometrical relation between the tool and the work piece when in operative position.

In testimony whereof I have signed my name to this specification.

CARL BLACK.

Certificate of Correction.

Patent No. 1,610,597.      Granted December 14, 1926, to

CARL BLACK.

It is hereby certified that error appears in the printed specification of the above-numbered patent requiring correction as follows: Page 2, after line 95, for the statement $$\frac{ac-ec}{ab-bd} = \frac{ae=ac}{ad=ab}$$

read $$\frac{ac-ec}{ab-bd} = \frac{ae}{ad} = \frac{ac}{ab};$$

and that the said Letters Patent should be read with this correction therein that the same may conform to the record of the case in the Patent Office.

Signed and sealed this 23d day of August, A. D. 1927.

[SEAL.]

M. J. MOORE,
*Acting Commissioner of Patents.*